(12) United States Patent
Yang et al.

(10) Patent No.: US 12,271,533 B2
(45) Date of Patent: Apr. 8, 2025

(54) HUMAN INTERFACE DEVICES WITH LIGHTING MODES

(71) Applicant: Hewlett-Packard Development Company, L.P., Spring, TX (US)

(72) Inventors: Shun-Tai Yang, Taipei (TW); Yu-Wei Chiu, Taipei (TW); Tsung-Yi Lin, Taipei (TW); Tony Wu, Taipei (TW); Yi-Wen Fang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 225 days.

(21) Appl. No.: 17/599,854

(22) PCT Filed: Jul. 26, 2019

(86) PCT No.: PCT/US2019/043548
§ 371 (c)(1),
(2) Date: Sep. 29, 2021

(87) PCT Pub. No.: WO2021/021068
PCT Pub. Date: Feb. 4, 2021

(65) Prior Publication Data
US 2022/0208484 A1    Jun. 30, 2022

(51) Int. Cl.
*H05B 47/105* (2020.01)
*G06F 3/02* (2006.01)
*G06F 3/04895* (2022.01)

(52) U.S. Cl.
CPC ......... *G06F 3/0202* (2013.01); *H05B 47/105* (2020.01)

(58) Field of Classification Search
CPC .................. G06F 3/04895; H05B 47/105
See application file for complete search history.

(56) References Cited

U.S. PATENT DOCUMENTS

| | | |
|---|---|---|
| 7,685,450 B2 | 3/2010 | Dutton et al. |
| 8,378,972 B2 | 2/2013 | Pance et al. |
| 8,411,029 B2 | 4/2013 | Casparian et al. |
| (Continued) | | |

FOREIGN PATENT DOCUMENTS

| | | | |
|---|---|---|---|
| CN | 101833371 A | * | 9/2010 |
| CN | 204203896 U | | 3/2015 |
| (Continued) | | | |

OTHER PUBLICATIONS

CN-101833371-A English Language Translation (Year: 2010).*
CN-109219208-B English Language Translation (Year: 2020).*
CN-109785936-A English Language Translation (Year: 2019).*

*Primary Examiner* — Curtis A Kuntz
*Assistant Examiner* — Jerold B Murphy
(74) *Attorney, Agent, or Firm* — Quarles & Brady LLP

(57) ABSTRACT

Changing a lighting mode for a human interface device is described herein. A first lighting mode can be initiated for a human interface device. Keys on the human interface device can be selected over a period of time at a frequency that is within a defined range. A second lighting mode for the human interface device can be identified based in part on the frequency being within the defined range. The first lighting mode and the second lighting mode can define a lighting scheme for light sources in the human interface device that reflect a user mood. The first lighting mode can be switched to the second lighting mode.

16 Claims, 6 Drawing Sheets

(56) References Cited

U.S. PATENT DOCUMENTS

| | | |
|---|---|---|
| 9,007,308 B2 | 4/2015 | Matsuoka |
| 2005/0073446 A1* | 4/2005 | Lazaridis ............... H01H 13/83 341/22 |
| 2010/0238120 A1 | 9/2010 | Hsieh |
| 2015/0334799 A1 | 11/2015 | Ascorra et al. |
| 2016/0100465 A1 | 4/2016 | Prescott et al. |
| 2016/0306439 A1 | 10/2016 | Prescott et al. |
| 2018/0136737 A1* | 5/2018 | Amarilio ............... G06F 3/0202 |

FOREIGN PATENT DOCUMENTS

| | | | | |
|---|---|---|---|---|
| CN | 109785936 A | * | 5/2019 | |
| CN | 109219208 B | * | 8/2020 | ......... G06K 9/00624 |
| KR | 10-1216852 B1 | | 12/2012 | |

* cited by examiner

HUMAN INTERFACE DEVICES WITH LIGHTING MODES

BACKGROUND

Human interface devices, such as computer keyboards, can provide a received input to a computing device. Computer keyboards can include an arrangement of buttons or keys, which can be pressed to produce letters, numbers or signs (characters). Computer keyboards can be illuminated, such that the buttons or keys can be backlit to facilitate use of the keyboard in dark environments.

DETAILED DESCRIPTION

Figure 1:
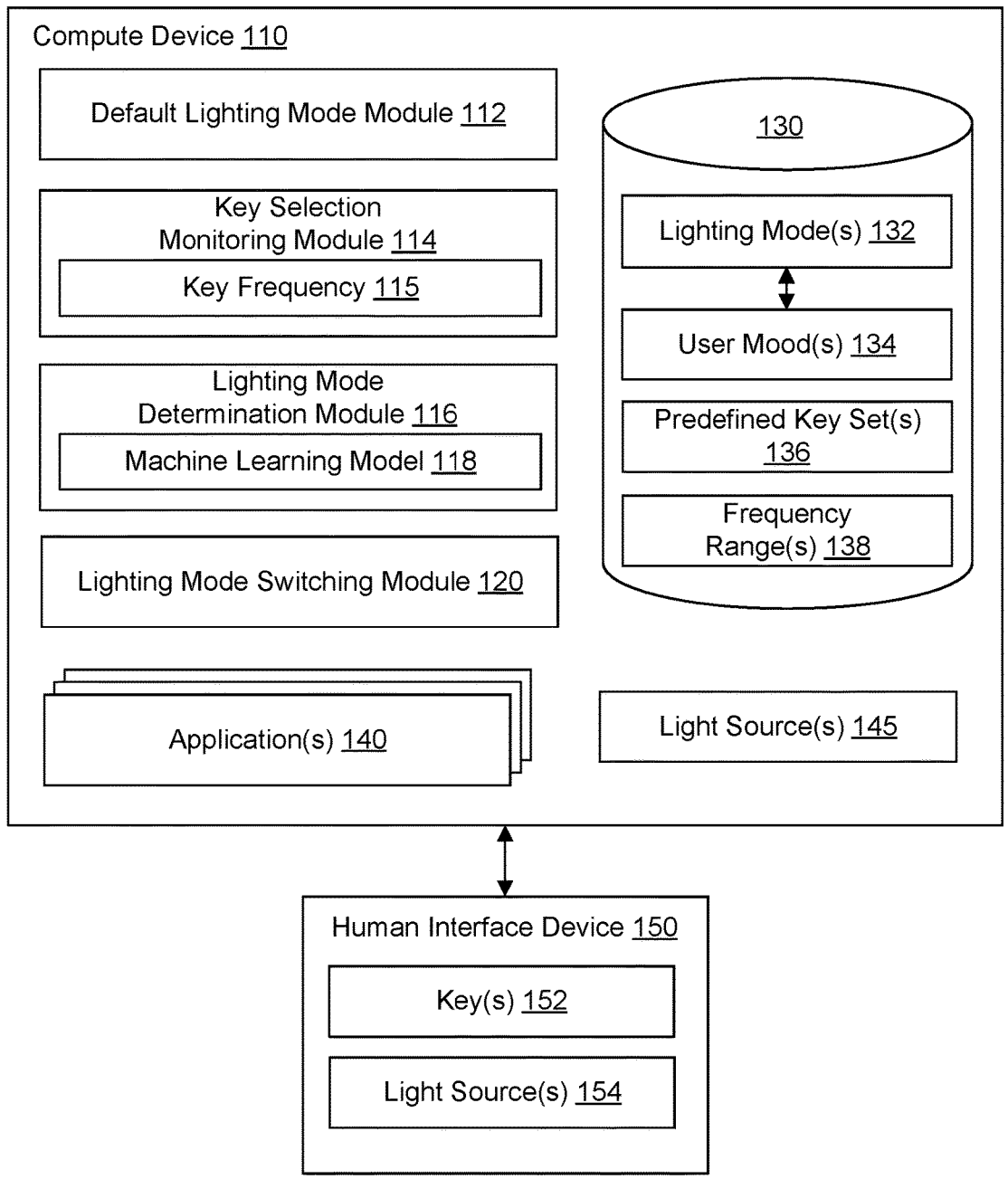
FIG. 1 illustrates an example of a computing system that includes a compute device and a human interface device in accordance with the present disclosure.

Human interface devices, such as keyboards, can feature different lighting modes. In one example, a user could open a command interface to manually switch a lighting mode for the human interface device. For example, a compute device could include a display to show the command interface, which could allow the user to manually switch the lighting mode. However, with this approach, the user would minimize or close an application that was currently executing in order to open the command interface and change the lighting mode. With the present disclosure, the lighting mode can be automatically switched while the application is executing on the compute device based on various factors, such as a frequency at which keys or buttons on the human interface device are being pressed or selected, a type of application that is executing on the compute device, user actions performed using the compute device, etc.

The present disclosure describes a non-transitory machine-readable storage medium, as well as a system and a method related to a human interface device with lighting modes. An example of the present disclosure can include a non-transitory machine-readable storage medium including instructions that, when executed by a processor, can cause the processor to initiate a first lighting mode for a human interface device. The instructions, when executed by the processor, can cause the processor to determine that keys on the human interface device are selected over a period of time at a frequency that is within a defined range. The instructions, when executed by the processor, can cause the processor to identify a second lighting mode for the human interface device based in part on the frequency being within the defined range. The first lighting mode and the second lighting mode can define a lighting scheme for light sources in the human interface device that reflect a user mood. The instructions, when executed by the processor, can cause the processor to switch from the first lighting mode to the second lighting mode.

In one example, the lighting scheme can define colors, animations, patterns, intensity levels, or combinations thereof for the light sources in the human interface device. In another example, the non-transitory machine-readable storage medium can include instructions that, when executed by the processor, cause the processor to: provide the frequency of the keys being selected over the period of time to a machine learning model; provide an application type to the machine learning model, wherein the application type corresponds to an application that is executing on a compute device that receives input from the human interface device; and identify, based on the machine learning model, the second lighting mode.

In one example, the keys can be included in a predefined set of keys. In another example, the non-transitory machine-readable storage medium can include instructions that, when executed by the processor, cause the processor to: switch from the first lighting mode to the second lighting mode while a gaming application executes on a compute device that receives input from the human interface device. In yet another example, the non-transitory machine-readable storage medium can include instructions that, when executed by the processor, cause the processor to: initiate the first lighting mode while a non-gaming application executes on a compute device that receives input from the human interface device.

In one example, the first lighting mode can be a calm lighting mode that reflects the user mood. In another example, the first lighting mode can be an excited lighting mode that reflects the user mood. In yet another example, the non-transitory machine-readable storage medium can include instructions that, when executed by the processor, cause the processor to: switch from the second lighting mode back to the first lighting mode when the frequency of the keys being selected over the period of time moves outside the defined threshold. In a further example, the human interface device can be a computer keyboard.

Another example of the present disclosure can include a computing system. The computing system can include a computer keyboard that includes keys and light sources. The computing system can include a compute device to receive input from the computer keyboard. The compute device can include a processor to: initiate a first lighting mode for the computer keyboard, where the first lighting mode can define a first configuration for the light sources in the computer keyboard, and the first lighting mode can reflect a first user mood. The processor can monitor the keys of the human interface device to determine the keys being selected over a period of time, where the keys monitored over the period of time can be included in a predefined set of keys. The processor can determine that a frequency of the keys being selected over the period of time is within a defined range. The processor can identify a second lighting mode for the computer keyboard based in part on the frequency being within the defined range, where the second lighting mode can define a second configuration for the light sources in the computer keyboard, and the second lighting mode can reflect a second user mood. The processor can switch from the first lighting mode to the second lighting mode.

In one example, the first lighting mode and the second lighting mode can define a lighting scheme for the computer keyboard, where the lighting scheme can define colors, animations, patterns, intensity levels, or combinations thereof for the light sources of the human interface device. In another example, the compute device can include additional light sources, wherein the first lighting mode and the second lighting mode define a lighting scheme for the additional light sources of compute device.

Another example of the present disclosure can be a method of changing a lighting mode for a computer keyboard. The method can include initiating a first lighting mode for the computer keyboard, where the first lighting mode can reflect a first user mood. The method can include monitoring keys being selected on the computer keyboard over a period of time, where the keys monitored over the period of time can be included in a predefined set of keys. The method can include determining that a frequency of the keys being selected over the period of time is within a defined range. The method can include identifying, using a machine learning model, a second lighting mode for the computer keyboard based in part on the frequency being within the defined range, where the second lighting mode can reflect a second user mood. The method can include switching from the first lighting mode to the second lighting mode. The method can include determining that the frequency of the keys being selected over a subsequent period of time moves outside the defined threshold. The method can include reverting back to the first lighting mode.

In these examples, it is noted that when discussing the storage medium, the method, or the system, any of such discussions can be considered applicable to the other examples, whether or not they are explicitly discussed in the context of that example. Thus, for example, in discussing details about an audio signal in the context of the storage medium, such discussion also refers to the methods and systems described herein, and vice versa.

Turning now to the FIGS., FIG. 1 illustrates an example of a computing system 100 that includes a compute device 110 and a human interface device 150. The compute device 110 can implement different lighting mode(s) 132 for the human interface device 150, which can correspond to different lighting schemes or lighting configurations for light sources 154 in the human interface device 150. The lighting mode(s) 132 can correspond with a mood of a user using the compute device 110 and/or the human interface device 150. As discussed in further detail below, a lighting mode 132 can be identified based on specific key(s) 152 (or buttons) that are pressed on the human interface device 150 at a given frequency, as well as additional factors, such as a type of application 140 (e.g., gaming application, word processing application) being executed on the compute device 110, user actions performed on the compute device 110, etc.

In one example, the human interface device 150 can be a type of computer device that takes input from humans and/or provides output to humans. A human interface device 150 that is capable of receiving an input can include, but is not limited to, a computer keyboard, a computer mouse, or a game controller that includes light sources 154 at various locations within the human interface device 150.

In one example, the light sources 154 can be positioned at various locations in the human interface device 150. For example, the light sources 154 can be behind the keys 152 to illuminate the keys 152, which can be useful when the human interface device 150 is being used in a dark room or environment. As another example, the light sources 154 can be integrated with a housing or exterior of the human interface device 150, such that the light sources 154 are visible to the user using the human interface device 150.

In one example, the light source(s) 154 can implement various lighting technologies suitable for inclusion in the human interface device 150. For example, the light source(s) 154 can be light-emitting diodes (LEDs), organic LEDs, polymer LEDs, active-matrix organic light-emitting diodes (AMOLEDs), light-emitting electrochemical cells, electroluminescent wires, etc. In another example, the light source(s) 154 can include fluorescent lamps, neon lamps, plasma lamps, xenon flash lamps, etc. In addition, the light source(s) 154 can be capable of producing various colors (e.g., red, green, blue, orange, yellow, black, white, purple) at various intensity levels.

In one example, the compute device 110 can include a non-transitory machine-readable storage medium 370 to store definition(s) of the lighting modes 132 and associated user moods 134. A lighting mode 132 can define a lighting scheme for the light sources 154 in the human interface device 150 that reflect a user mood 134. The lighting scheme can define colors, animations, patterns, intensity levels (e.g., bright versus dim), etc. for the light sources 154 in the human interface device 150. For example, a defined lighting mode 132 can be associated with defined color(s), a defined intensity level, a defined animation or pattern, etc., and the defined lighting mode 132 can be associated with a particular user mood 134, such as calm, excited, angry, sad, humorous, romantic, happy, etc.

In one example, the lighting mode 132 can include a default lighting mode for the human interface device 150. The default lighting mode can be associated with defined color(s), a defined intensity level, etc., that correspond to a default lighting setting for the human interface device 150. The default lighting mode can be associated with a default user mood or no user mood.

As a non-limiting example, a sad or calm lighting mode can be associated with gray or blue light colors, no animation, a relatively low luminous intensity, etc. As another non-limiting example, a happy or excited lighting mode can be associated with bright colors, an upbeat animation that includes blinking lights, a high luminous intensity, etc. As yet another non-limiting example, a romantic lighting mode can be associated with red or pink light colors, no animation, a relatively low luminous intensity, etc. As a further non-limiting example, the default lighting mode can be associated with white lights, no animation, reduced luminous intensity, etc. or alternatively, the defaulting light mode can correspond to no lighting.

In an alternative example, the defined lighting mode 132 can be associated with an application 140 or type of application 140 that is executing on the compute device 110. In other words, different lighting modes 132 can be initiated depending on the application 140 and/or type of application 140 being executed on the compute device 110. Non-limiting examples of the applications 140 can include gaming applications, word processing applications, video applications, photo editing applications, social networking applications, etc.

As a non-limiting example, a first lighting mode with a first lighting scheme can correspond to a gaming application and/or a type of gaming application. In this example, the first lighting mode can have predefined colors, intensity levels, etc. that are tailored to the gaming application and/or the type of gaming application. As another non-limiting example, a second lighting mode with a second lighting scheme can correspond to a word processing application. In this example, the second lighting mode can have predefined colors, intensity levels, etc. that are tailored to the word processing application. As yet another example, a third lighting mode with a third lighting scheme can correspond to a video application for watching videos. In this example, the third lighting mode can have predefined colors, intensity levels, etc. that are tailored to the video application.

In one configuration, the compute device 110 can include a default lighting mode module 112, which can initiate the default lighting mode. For example, the default lighting mode module 112 can initiate the default lighting mode when the compute device 110 and/or the human interface device 150 are booted up/powered on or after the human interface device 150 has gone unused for a period of time. In one example, the default lighting mode can be used prior to execution of certain applications 140 on the compute device 110, such as gaming applications, word processing applications, media applications, etc.

In one configuration, the compute device 110 can include a key selection monitoring module 114 to monitor keys 152 being pressed or selected on the human interface device 150 over a period of time. In one example, the key selection monitoring module 114 can monitor keys 152 that are included in predefined key set(s) 136, which can be stored in the non-transitory machine-readable storage medium 130. A predefined key set 136 can indicate a group of keys 152 that are of particular interest, and can be indicative of the user mood. In other words, in one configuration, the key selection monitoring module 114 can detect that keys 152 included in the predefined key set 136 are pressed or selected, and may not detect when keys 152 that are not included in the predefined key set 136 are pressed or selected.

In one example, the key(s) 152 on the human interface device 150 can represent letters (e.g., A, B, C), numbers (e.g., 1, 2, 3), symbols (e.g., !, @, #), functions (e.g., F1, Backspace, Shift), etc.

As a non-limiting example, a first predefined key set can include "Q", "W", "E", "R", "A", "S", "D", "F", and "Space Bar". The first predefined key set can correspond to keys 152 commonly pressed or selected when the user is playing a gaming application. As another non-limiting example, a second predefined key set can include "Space Bar", "Enter", "Up Arrow", "Down Arrow", "M", "F", "Left Arrow", and "Right Arrow". The second predefined key set can correspond to keys 152 commonly pressed or selected when the user is watching videos on a video application.

In one example, the key selection monitoring module 114 can determine a key frequency 115 (or rate) at which the keys 152 included in the predefined key set 136 are pressed or selected over the period of time. For example, the key selection monitoring module 114 can determine the key frequency 115 at which the keys 152 included in the predefined key set 136 are pressed or selected over a period of 15 seconds, 30 seconds, one minute, two minutes, three minutes, five minutes, etc.

In one configuration, the compute device 110 can include a lighting mode determination module 116 to determine the lighting mode 132 for the human interface device 150 based in part on the key frequency 115 at which keys 152 included in the predefined key set 136 are pressed or selected over the period of time. In one example, the lighting mode determination module 116 can compare the key frequency 115 to frequency range(s) 138 (or frequency thresholds) stored in the non-transitory machine-readable storage medium 130. The frequency ranges 138 can be associated with the lighting modes 132. For example, a first frequency range can be associated with a first lighting mode, a second frequency range can be associated with a second lighting mode, and so on. The lighting mode determination module 116 can compare the key frequency 115 to the frequency ranges 138 to identify a frequency range 138 in which the key frequency 115 is included. Based on the frequency range 138 that is identified, the lighting mode determination module 116 can determine the lighting mode 132 associated with that frequency range 138. Therefore, based on the key frequency 115 in comparison to the frequency range 138, the lighting mode determination module 116 can determine the lighting mode 132 for the human interface device 150 that is most relevant or applicable to the user's current activities on the compute device 110.

In one example, the lighting mode determination module 116 can determine the user mood 134 based in part on the key frequency 115 at which keys 152 included in the predefined key set 136 are pressed or selected over the period of time. For example, certain frequency ranges 138 can be associated with particular user moods 134. After the user mood 134 is determined, the lighting mode determination module 116 can determine the lighting mode 132 that corresponds with the user mood 134.

As a non-limiting example, a first frequency range between 0-15 key presses/selections per minute can be associated with a calm lighting mode, a second frequency range between 30-60 key presses/selections per minute can be associated with a studious lighting mode, and a third frequency range between 90-120 key presses/selections per minute can be associated with an excited lighting mode. In this non-limiting example, the lighting mode determination module 116 can determine that the frequency at which keys 152 included in the predefined key set 136 are pressed or selected over a one-minute period is 50 key presses/selections per minute. Thus, the lighting mode determination module 116 can determine that the studious lighting mode is to be applied or implemented using the light sources 154 the human interface device 150.

In one configuration, the lighting mode determination module 116 can determine the lighting mode 132 using a machine learning model 118. For example, the key frequency 115 at which keys 152 included in the predefined key set 136 are pressed or selected over the period of time can be provided to the machine learning model 118. Based on the received input of the key frequency 115, the machine learning model 118 can produce an output of the lighting mode 132. Further, the machine learning model 118 can use additional factors to determine the lighting mode 132, such as the type of application 140 (e.g., gaming application, word processing application) being executed on the compute device 110, user actions performed on the compute device 110 (e.g., visiting electronic web pages, listening to music, electronic chatting), etc. In other words, the key frequency 115, the type of application 140, the user actions, and other information can be provided to the machine learning model 118, and the lighting mode determination module 116 can use the machine learning model 118 to determine the lighting mode 132 for the human interface device 150 that is most relevant or applicable to the user's current activities on the compute device 110.

As an example, the machine learning model 118 can be generated using supervised learning, unsupervised learning or reinforcement learning. The machine learning model 118 can apply feature learning, sparse dictionary learning, anomaly detection, decision trees, association rules, heuristic rules, etc. to enhance a performance of the machine learning model 118 over time. In addition, the machine learning model 118 may incorporate statistical models (e.g., regression), principal component analysis, deep neural networks, or a type of artificial intelligence (AI).

In one configuration, the compute device 110 can include a lighting mode switching module 120 to switch between lighting modes 132. For example, the lighting mode switching module 120 can switch between a first lighting mode (e.g., calm lighting mode) and a second lighting mode (e.g., excited lighting mode), or switch between a default lighting mode or no lighting to a particular lighting mode (e.g., sad lighting mode). The lighting mode switching module 120 can initiate the lighting mode 132 that is being switched to by controlling the light sources 154 in the human interface device 150 to produce certain colors, certain animations, certain intensity levels, etc. in accordance with the lighting mode 132.

In one configuration, the key selection monitoring module 114, the lighting mode determination module 116 and the lighting mode switching module 120 can operate while the application 140 is being executed on the compute device 110. In other words, the keys 152 included in the predefined key set 136 can be monitored and the key frequency 115 can be determined, the lighting mode 132 can be determined based in part on the key frequency 115, and a switch to the lighting mode 132 can be initiated while the application 140 (e.g., a gaming application) is being executed on the compute device 110.

In one configuration, the key frequency 115 can be continuously determined, and a check of whether to switch the lighting mode 132 can be continuously performed. For example, the key frequency 115 can be recalculated at a defined periodicity (e.g., every one minute, every two minutes). When the key frequency 115 is within a different frequency range 138 or less than or greater than a predetermined threshold, the lighting mode 132 can be switched for the human interface device 150.

In one example, users could open a separate command interface to manually switch a lighting mode for the human interface device 150. For example, the compute device 110 can include a display (not shown) to show the command interface, which could allow the users to manually switch the lighting mode. For example, the user could manually select a calm lighting mode or an excited lighting mode for the human interface device 150. However, with this approach, users would minimize or close an application that was currently executing in order to open the command interface and change the lighting mode. A user that was feeling excited when playing a gaming application may not feel that same emotion if the user had to close the gaming application to change the lighting mode, which made manually changing the lighting mode meaningless. With the present disclosure, the lighting mode can be automatically switched while the application 140 is executing based on various factors, such as a key frequency in relation to frequency ranges or thresholds, a type of application 140 that is executing on the compute device 110, user actions performed using the compute device 110, etc.

In one configuration, the compute device 110 can include light sources 145, which can be separate from the light sources 154 included in the human interface device 150. For example, the compute device 110 can include the light sources 145 on a housing of the compute device 110. In this configuration, the lighting mode determination module 116 can determine the lighting mode 132 based in part on the key frequency 115. The lighting mode switching module 120 can initiate the lighting mode 132 that is being switched to by controlling the light sources 145 in the compute device 110 and/or the light sources 154 in the human interface device 150 to produce certain colors, certain animations, certain intensity levels, etc. in accordance with the lighting mode 132. Thus, in this configuration, both the compute device 110 and the human interface device 150 can produce lighting that is reflective of the user mood 134.

Figure 2:
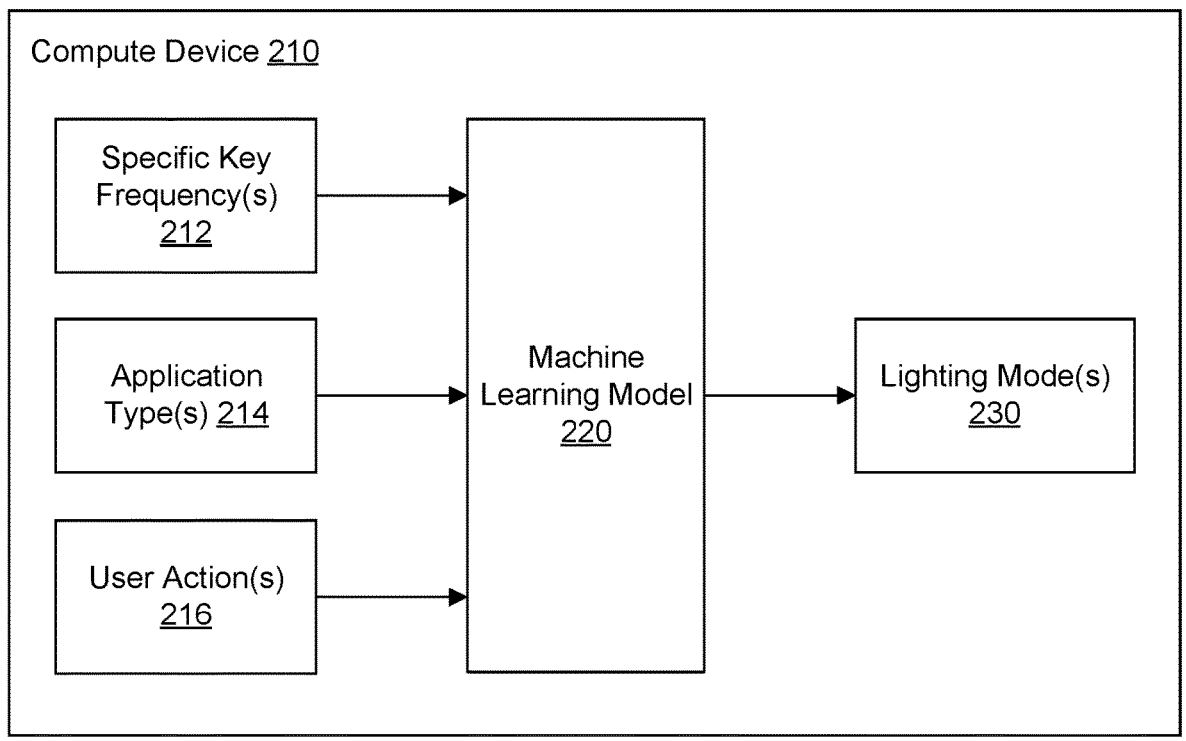
FIG. 2 illustrates an example of a machine learning model that outputs a lighting mode based on received inputs in accordance with the present disclosure.

FIG. 2 illustrates an example of a machine learning model 220 that outputs a lighting mode 230 based on received inputs. The machine learning model 220 can run on a compute device 210. The received inputs can include a specific key frequency 212, an application type 214 and user actions 216. The specific key frequency 212 can indicate a frequency at which specific keys are pressed or selected over a duration of time. A non-limiting example of the specific key frequency 212 can be 72 key presses or selections per 5 seconds. The specific keys can be predefined, e.g., "Q". "W", "E", and "R". In this example, the frequency can relate to these specific predefined keys and may not be applicable to other keys. The application type 214 can indicate a name and/or type of application that is executing on the compute device 210. Non-limiting examples of application types include gaming applications, word processing applications, video applications, photo editing applications, social networking applications, etc. In a further example, the application type 214 can indicate a specific sub-type of application. For example, the application type 214 can indicate that a particular gaming application is related to a first-person shooter game, a sports game, a strategy game, etc. The user actions 216 can indicate specific actions performed by a user using the compute device 210. Non-limiting examples of the user actions 216 can include visiting electronic web pages such as shopping web pages, listening to music, electronic chatting, watching videos, etc.

In one configuration, the specific key frequency 212, the application type 214 and the user actions 216 can be provided as inputs to the machine learning model 220. The machine learning model 220 can be trained to identify appropriate lighting modes 230 based on various specific key frequencies 212, application types 214 and/or user actions 216. In this example, the machine learning model 220 can determine the lighting mode 230 that is most relevant or applicable to a user's current activities on the compute device 210.

Figure 3:
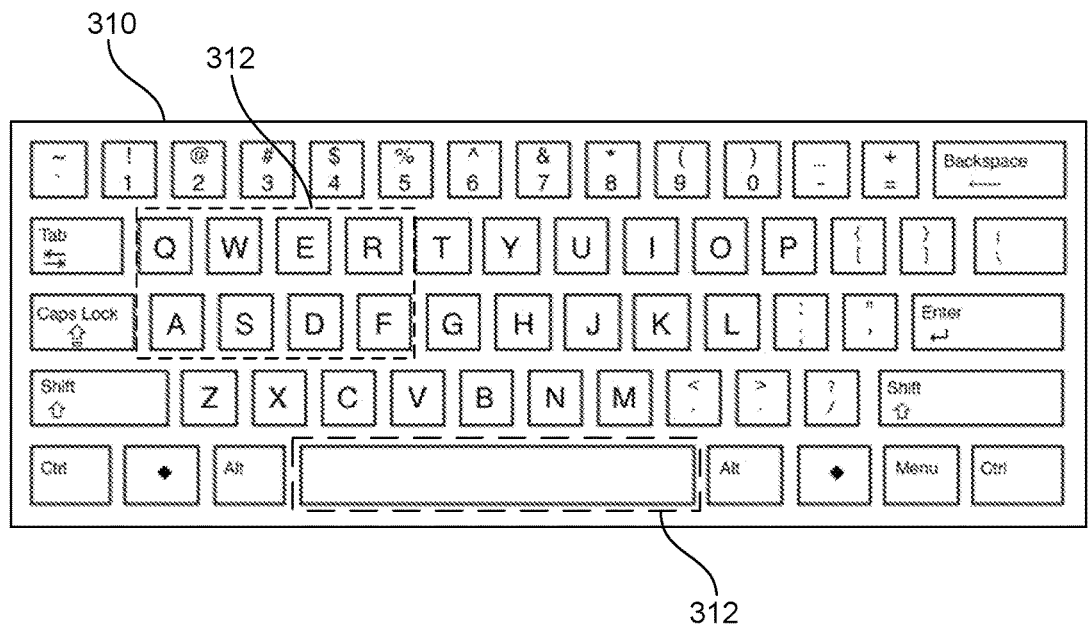
FIG. 3 illustrates an example of a predefined set of keys on a keyboard in accordance with the present disclosure.

FIG. 3 illustrates an example keyboard 310 with a group or set of keys 312. In this example, the group or set of keys 312 can include "Q", "W", "E", "R", "A", "S", "D", "F", and "Space Bar". Note that the space bar is not spatially located by the other keys, but is still grouped therewith in this example. The predefined set of keys 312 can correspond to keys commonly pressed or selected when the user is playing a gaming application, for example. When keys that are included in the predefined set of keys on the keyboard 310 are pressed or selected at a key frequency that is within a frequency range or greater than a defined threshold, a lighting mode can be changed for the keyboard 310.

Figure 4:
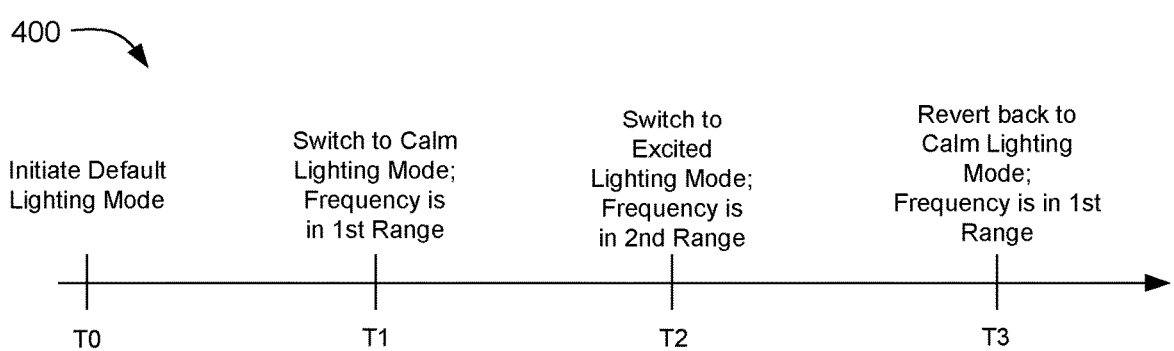
FIG. 4 illustrates an example of a timeline for changing between lighting modes for a human interface device in accordance with the present disclosure.

FIG. 4 illustrates an example of a timeline 400 for changing between lighting modes for a human interface device. At a first time (T0), a default lighting mode can be initiated at the human interface device. For example, the defaulting lighting mode can be no lighting, or alternatively, the default lighting mode can be defined by a lighting scheme that consists of a specific combination of colors, animations, patterns and/or luminous intensities for light sources in the human interface device. At a second time (T1), a key frequency can be within a first defined range that corresponds to a calm user mood, and in response, the default lighting mode can be switched to a calm lighting mode. The calm lighting mode can be defined by a lighting scheme that consists of a specific combination of colors, animations, patterns and/or luminous intensities for the light sources in the human interface device. At a third time (T2), the key frequency can be recalculated and a determination can be made that the key frequency is now within a second defined range that corresponds to an excited user mood. In response, the calm lighting mode can be switched to the excited lighting mode. The excited lighting mode can be defined by a lighting scheme that consists of a specific combination of colors, animations, patterns and/or luminous intensities for the light sources in the human interface device. At a fourth time (T3), the key frequency can be recalculated and a determination can be made that the key frequency is now within the first defined range that corresponds to the calm user mood. In response, the excited lighting mode can be switched back to the calm lighting mode.

Figure 5:
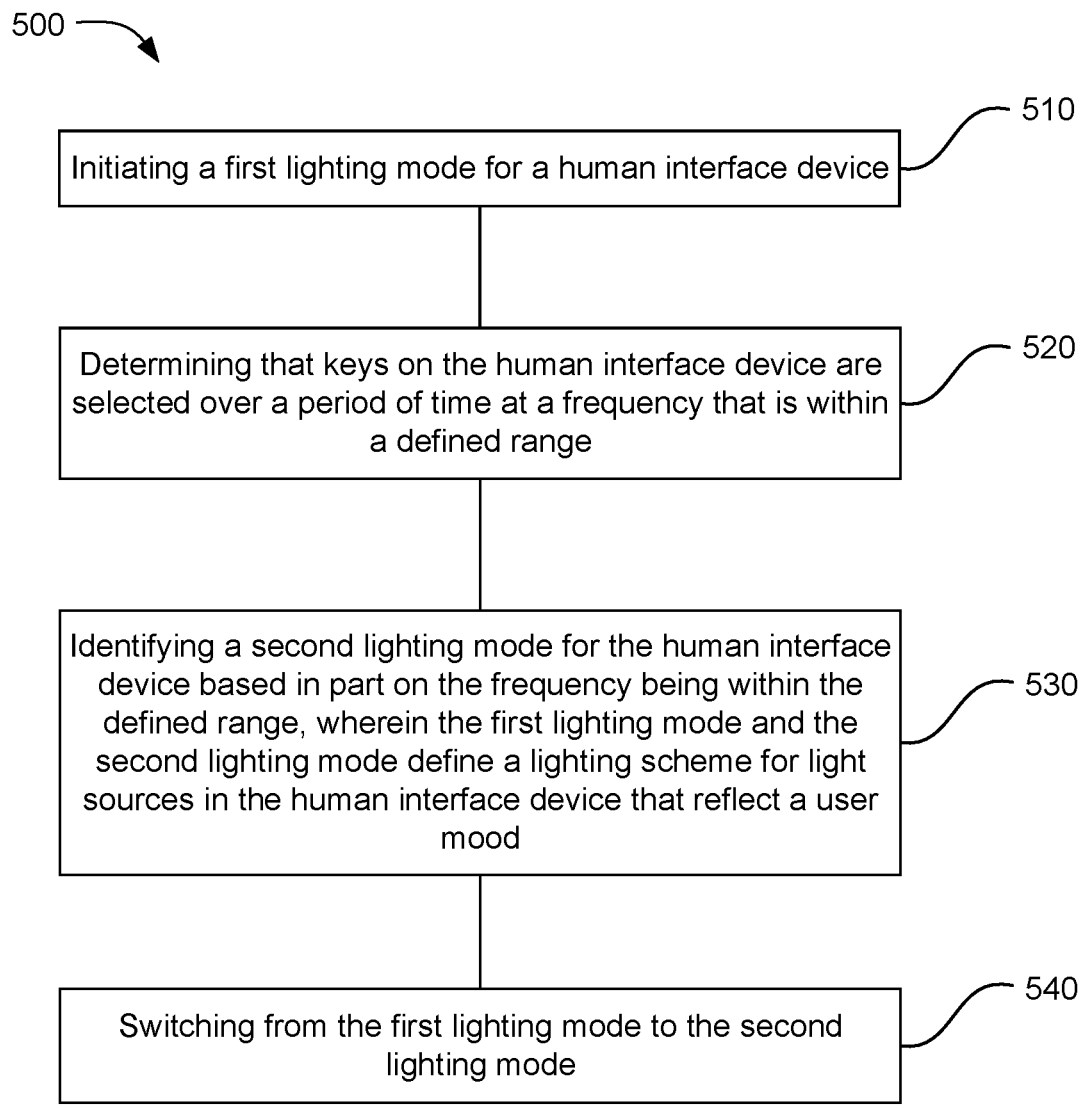
FIG. 5 is a flowchart illustrating an example method of changing a lighting mode for a human interface device in accordance with the present disclosure.

FIG. 5 is a flowchart illustrating one example method 500 of changing a lighting mode for a human interface device. The method can be executed as instructions on a machine, where the instructions can be included on a non-transitory machine readable storage medium. The method can include initiating a first lighting mode for a human interface device, as in block 510. The method can include determining that keys on the human interface device are selected over a period of time at a frequency that exceeds a defined threshold, as in block 520. The method can include identifying a second lighting mode for the human interface device based in part on the frequency exceeding the defined threshold, wherein the first lighting mode and the second lighting mode define a lighting scheme for light sources in the human interface device that reflect a user mood, as in block 530. The method can include switching from the first lighting mode to the second lighting mode, as in block 540. In one example, the method 500 can be performed using the computing system 100, but the method 500 is not limited to being performed using the computing system 100.

Figure 6:
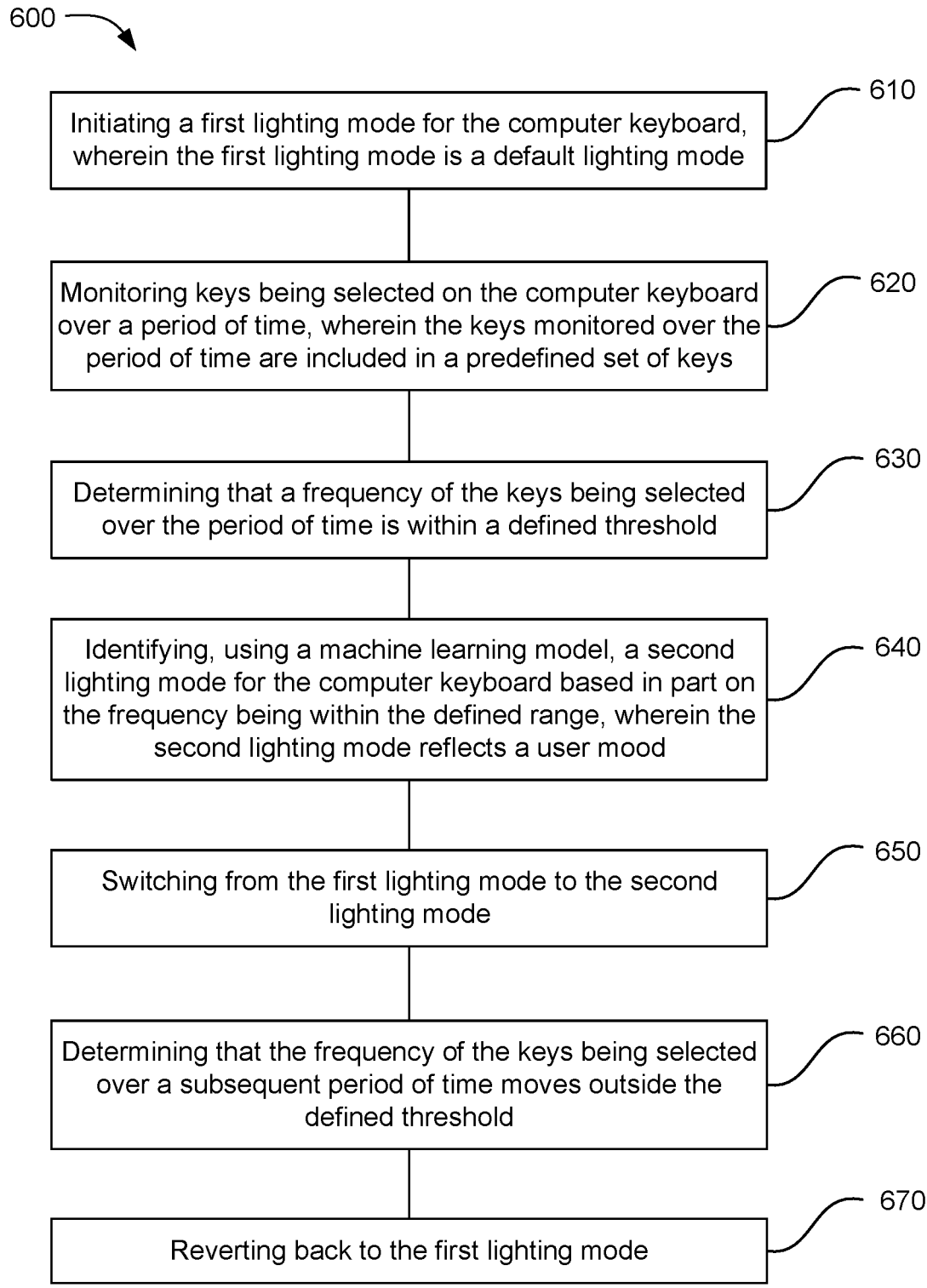
FIG. 6 is a flowchart illustrating an example method of changing a lighting mode for a computer keyboard in accordance with the present disclosure.

FIG. 6 is a flowchart illustrating one example method 600 of changing a lighting mode for a computer keyboard. The method can be executed as instructions on a machine, where the instructions can be included on a non-transitory machine readable storage medium. The method can include initiating a first lighting mode for the computer keyboard, wherein the first lighting mode is a default lighting mode, as in block 610. The method can include monitoring keys being selected on the computer keyboard over a period of time, wherein the keys monitored over the period of time are included in a predefined set of keys, as in block 620. The method can include determining that a frequency of the keys being selected over the period of time exceeds a defined threshold, as in block 630. The method can include identifying, using a machine learning model, a second lighting mode for the computer keyboard based in part on the frequency exceeding the defined threshold, wherein the second lighting mode reflects a user mood, as in block 640. The method can include switching from the first lighting mode to the second lighting mode, as in block 650. The method can include determining that the frequency of the keys being selected over a subsequent period of time falls below the defined threshold, as in block 660. The method can include reverting back to the first lighting mode, as in block 670. In one example, the method 600 can be performed using the computing system 100, but the method 600 is not limited to being performed using the computing system 100.

Figure 7:
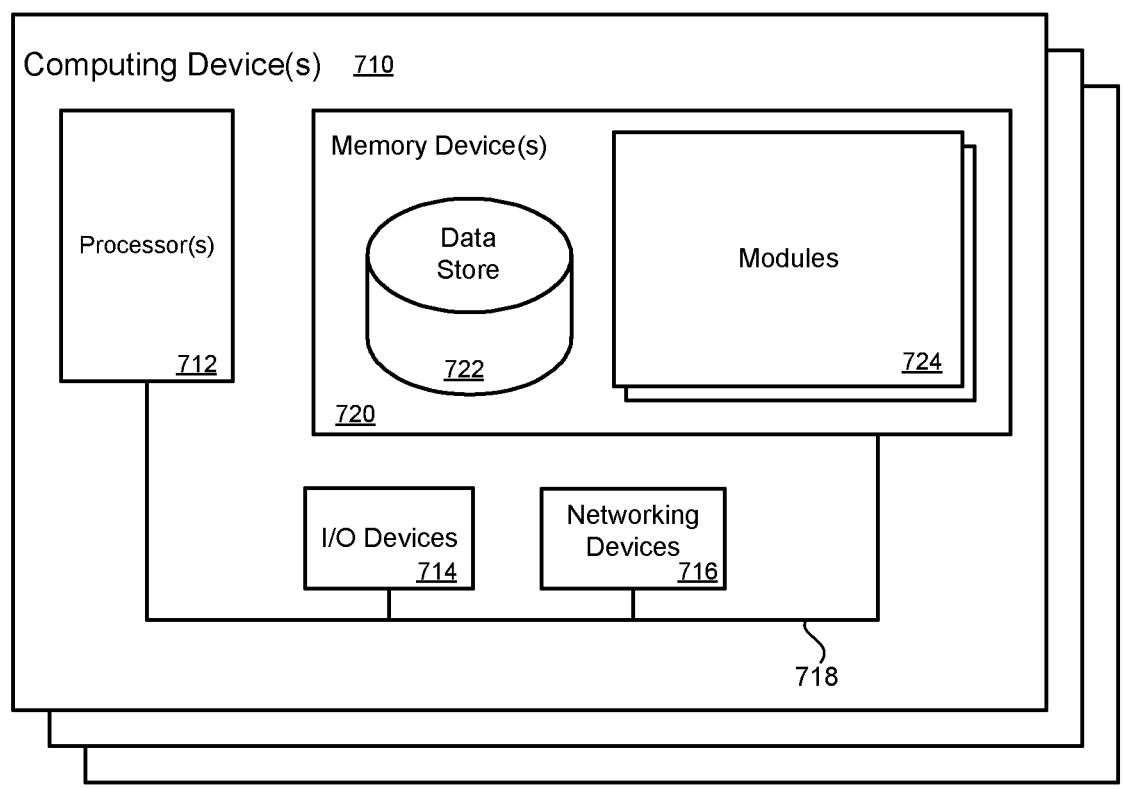
FIG. 7 is a block diagram that provides an example illustration of a computing device that can be employed in the present disclosure.

FIG. 7 illustrates a computing device 710 on which modules of this disclosure can execute. A computing device 710 is illustrated on which a high level example of the disclosure can be executed. The computing device 710 can include processor(s) 712 that are in communication with memory devices 720. The computing device can include a local communication interface 718 for the components in the computing device. For example, the local communication interface can be a local data bus and/or a related address or control busses as can be desired.

The memory device 720 can contain modules 724 that are executable by the processor(s) 712 and data for the modules 724. The modules 724 can execute the functions described earlier, such as: initiating a first lighting mode for a human interface device; determining that keys on the human interface device are selected over a period of time at a frequency that exceeds a defined threshold; identifying a second lighting mode for the human interface device based in part on the frequency exceeding the defined threshold, wherein the first lighting mode and the second lighting mode define a lighting scheme for light sources in the human interface device that reflect a user mood; and switching from the first lighting mode to the second lighting mode.

A data store 722 can also be located in the memory device 720 for storing data related to the modules 724 and other applications along with an operating system that is executable by the processor(s) 712.

Other applications can also be stored in the memory device 720 and can be executable by the processor(s) 712. Components or modules discussed in this description that can be implemented in the form of non-transitory machine-readable software using high programming level languages that are compiled, interpreted or executed using a hybrid of the methods.

The computing device can also have access to I/O (input/output) devices 714 that are usable by the computing devices. An example of an I/O device is a display screen that is available to display output from the computing devices. Networking devices 716 and similar communication devices can be included in the computing device. The networking devices 716 can be wired or wireless networking devices that connect to the internet, a local area network (LAN), wide area network (WAN), or other computing network.

The components or modules that are shown as being stored in the memory device 720 can be executed by the processor 712. The term "executable" can mean a program file that is in a form that can be executed by a processor 712. For example, a program in a higher level language can be compiled into machine code in a format that can be loaded into a random access portion of the memory device 720 and executed by the processor 712, or source code can be loaded by another executable program and interpreted to generate instructions in a random access portion of the memory to be executed by a processor. The executable program can be stored in a portion or component of the memory device 720. For example, the memory device 720 can be random access memory (RAM), read only memory (ROM), flash memory, a solid state drive, memory card, a hard drive, optical disk, floppy disk, magnetic tape, or other memory components.

The processor 712 can represent multiple processors and the memory 720 can represent multiple memory units that operate in parallel to the processing circuits. This can provide parallel processing channels for the processes and data in the system. The local interface 718 can be used as a network to facilitate communication between the multiple processors and multiple memories. The local interface 718 can use additional systems designed for coordinating communication such as load balancing, bulk data transfer, and similar systems.

While the flowcharts presented for this disclosure can imply a specific order of execution, the order of execution can differ from what is illustrated. For example, the order of two more blocks can be rearranged relative to the order shown. Further, multiple, e.g., two, three, four, etc.) blocks shown in succession can be executed in parallel or with partial parallelization. In some configurations, block(s) shown in the flow chart can be omitted or skipped. A number of counters, state variables, warning semaphores, or messages can be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module can be implemented as a hardware circuit including custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in non-transitory machine-readable software for execution by various types of processors. An identified module of executable code can, for instance, include block(s) of computer instructions, which can be organized as an object, procedure, or function. Nevertheless, the executables of an identified module need not be physically located together, but can include disparate instructions stored in different locations which include the module and achieve the stated purpose for the module when joined logically together.

Indeed, a module of executable code can be a single instruction, or many instructions, and can even be distributed over several different code segments, among different programs, and across several memory devices. Similarly, operational data can be identified and illustrated herein within modules, and can be embodied in a suitable form and organized within a suitable type of data structure. The operational data can be collected as a single data set, or can be distributed over different locations including over different storage devices. The modules can be passive or active, including agents operable to perform desired functions.

The disclosure described here can also be stored on a computer readable storage medium that includes volatile and non-volatile, removable and non-removable media implemented with a disclosure for the storage of information such as computer readable instructions, data structures, program modules, or other data. Computer readable storage media can include, but is not limited to, RAM, ROM, electrically erasable programmable read-only memory (EEPROM), flash memory or other memory disclosure, compact disc read-only memory (CD-ROM), digital versatile disks (DVD) or other optical storage, magnetic cassettes, magnetic tapes, magnetic disk storage or other magnetic storage devices, or other computer storage medium which can be used to store the desired information and described disclosure.

The devices described herein can also contain communication connections or networking apparatus and networking connections that allow the devices to communicate with other devices. Communication connections can be an example of communication media. Communication media can embody computer readable instructions, data structures, program modules and other data in a modulated data signal such as a carrier wave or other transport mechanism and can include information delivery media. By way of example, and not limitation, communication media can include wired media such as a wired network or direct-wired connection, and wireless media such as acoustic, radio frequency, infrared, and other wireless media. The term computer readable media as used herein can include communication media.

Reference was made to the examples illustrated in the drawings, and specific language was used herein to describe the same. It will nevertheless be understood that no limitation of the scope of the disclosure is thereby intended. Alterations and further modifications of the features illustrated herein, and additional applications of the examples as illustrated herein, are to be considered within the scope of the description.

Furthermore, the described features, structures, or characteristics can be combined in a suitable manner. In the preceding description, numerous specific details were provided, such as examples of various configurations to provide a thorough understanding of examples of the described disclosure. The disclosure may be practiced without some of the specific details, or with other methods, components, devices, etc. In other instances, some structures or operations are not shown or described in detail to avoid obscuring aspects of the disclosure.

Although the subject matter has been described in language specific to structural features and/or operations, it is to be understood that the subject matter defined in the appended claims is not limited to the specific features and operations described above. Rather, the specific features and acts described above are disclosed as example forms of implementing the claims. Numerous modifications and alternative arrangements can be devised without departing from the scope of the described disclosure.

What is claimed is:

1. A non-transitory machine-readable storage medium comprising instructions that, when executed by a processor, cause the processor to:
    initiate a first lighting mode for a human interface device;
    determine that keys on the human interface device are selected over a period of time at a frequency that is within a first defined range;
    provide the frequency of the keys being selected over the period of time to a machine learning model;
    identify, using the machine learning model, a second lighting mode for the human interface device based in part on the frequency being within the first defined range, wherein the first lighting mode and the second lighting mode define a lighting scheme for light sources in the human interface device that reflect a user mood; and
    switch from the first lighting mode to the second lighting mode,
    wherein the first defined range is predetermined, and
    wherein a plurality of predetermined ranges are each related to a distinct lighting mode,
    such that the first defined range correlates to the second lighting mode and a second
    defined range, distinct from the first defined range, correlates to the first lighting mode.

2. The non-transitory machine readable storage medium of claim 1, wherein the lighting scheme defines colors, animations, patterns, intensity levels, or combinations thereof for the light sources in the human interface device.

3. The non-transitory machine readable storage medium of claim 1, comprising instructions that, when executed by the processor, cause the processor to:
    further provide an application type to the machine learning model, wherein the application type corresponds to an application that is executing on a compute device that receives input from the human interface device; and identify, based on the machine learning model, the second lighting mode.

4. The non-transitory machine readable storage medium of claim 1, wherein the keys are included in a predefined set of keys.

5. The non-transitory machine readable storage medium of claim 1, comprising instructions that, when executed by the processor, cause the processor to: switch from the first lighting mode to the second lighting mode while a gaming application executes on a compute device that receives input from the human interface device.

6. The non-transitory machine readable storage medium of claim 1, comprising instructions that, when executed by the processor, cause the processor to: initiate the first lighting mode while a non-gaming application executes on a compute device that receives input from the human interface device.

7. The non-transitory machine readable storage medium of claim 1, wherein the first lighting mode is a calm lighting mode that reflects the user mood.

8. The non-transitory machine readable storage medium of claim 1, wherein the first lighting mode is an excited lighting mode that reflects the user mood.

9. The non-transitory machine readable storage medium of claim 1, comprising instructions that, when executed by the processor, cause the processor to: switch from the second lighting mode back to the first lighting mode when the frequency of the keys being selected over the period of time moves outside the first defined range and within the second defined range.

10. The non-transitory machine readable storage medium of claim 1, wherein the human interface device is a computer keyboard.

11. A computing system, comprising:
a computer keyboard that comprises keys and light sources; and
a compute device to receive input from the computer keyboard, the compute device comprising a processor to:
initiate a first lighting mode for the computer keyboard, wherein the first lighting mode defines a first configuration for the light sources in the computer keyboard, and the first lighting mode reflects a first user mood;
monitor the keys of the human interface device to determine the keys being selected over a period of time, wherein the keys monitored over the period of time are included in a predefined set of keys;
determine that a frequency of the keys being selected over the period of time is within a first defined range;
identify, using a machine learning model, a second lighting mode for the computer keyboard based in part on the frequency being within the first defined range, wherein the second lighting mode defines a second configuration for the light sources in the computer keyboard, and the second lighting mode reflects a second user mood; and
switch from the first lighting mode to the second lighting mode,
wherein the first defined range is predetermined, and
wherein a plurality of predetermined ranges are each related to a distinct lighting mode,
such that the first defined range correlates to the second lighting mode and a second
defined range, distinct from the first defined range, correlates to the first lighting mode.

12. The computing system of claim 11, wherein the first lighting mode and the second lighting mode define a lighting scheme for the computer keyboard, wherein the lighting scheme defines colors, animations, patterns, intensity levels, or combinations thereof for the light sources of the human interface device.

13. The computing system of claim 11, wherein the compute device includes additional light sources, wherein the first lighting mode and the second lighting mode define a lighting scheme for the additional light sources of compute device.

14. A method of changing a lighting mode for a computer keyboard, comprising:
initiating a first lighting mode for the computer keyboard, wherein the first lighting mode is a default lighting mode;
monitoring keys being selected on the computer keyboard over a period of time, wherein the keys monitored over the period of time are included in a predefined set of keys;
determining that a frequency of the keys being selected over the period of time is within a defined range;
identifying, using a machine learning model, a second lighting mode for the computer keyboard based in part on the frequency being within the defined range, wherein the second lighting mode reflects a user mood;
switching from the first lighting mode to the second lighting mode;
determining that the frequency of the keys being selected over a subsequent period of time moves outside the defined threshold; and
reverting back to the first lighting mode.

15. The method of claim 14, wherein the first lighting mode and the second lighting mode define a lighting scheme for the computer keyboard, wherein the lighting scheme defines colors, animations, patterns, intensity levels, or combinations thereof for light sources of the computer keyboard.

16. The method of claim 14,
wherein the defined range is predetermined, and
wherein a plurality of predetermined ranges are each related to a distinct lighting mode.

* * * * *